Patented Sept. 8, 1931

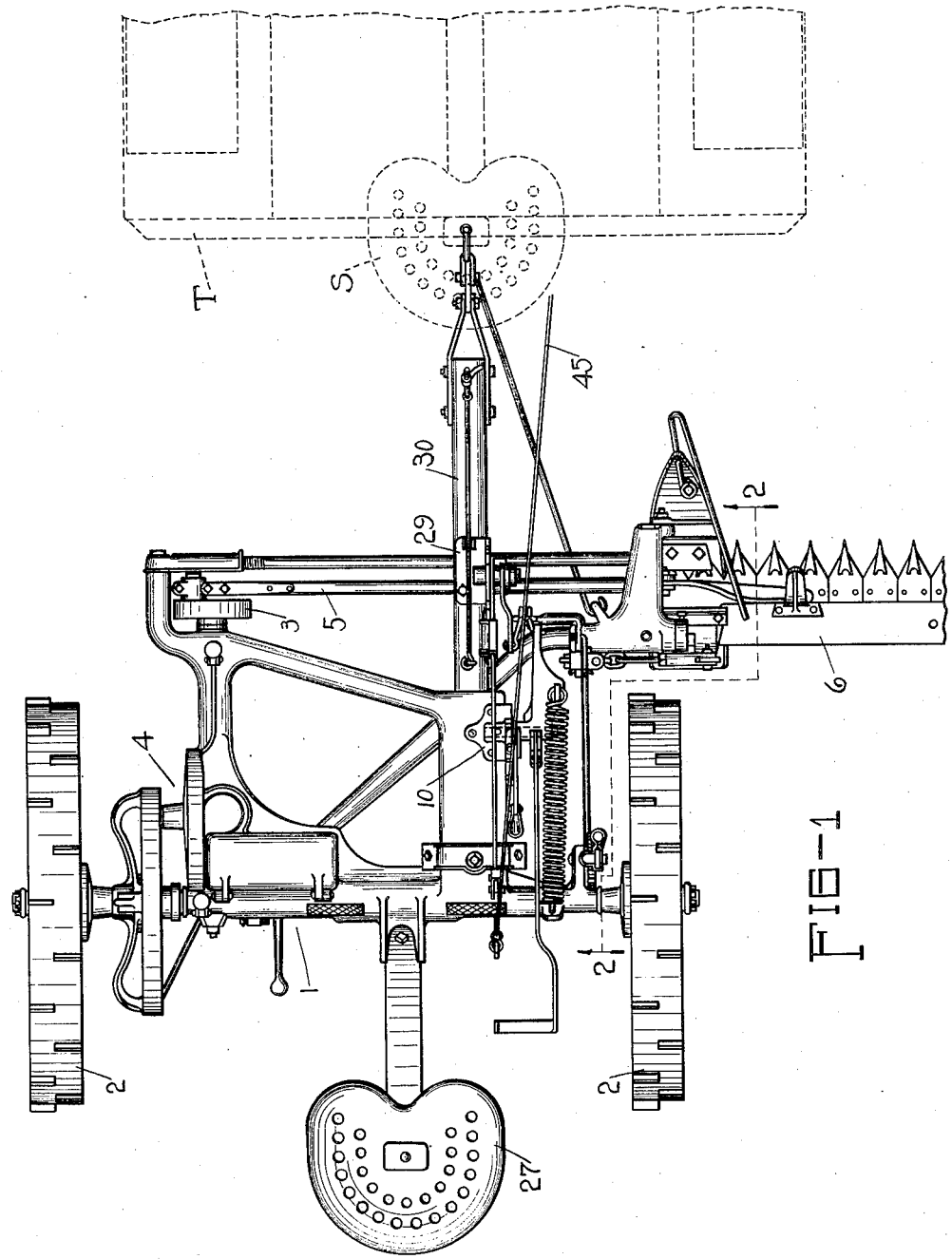

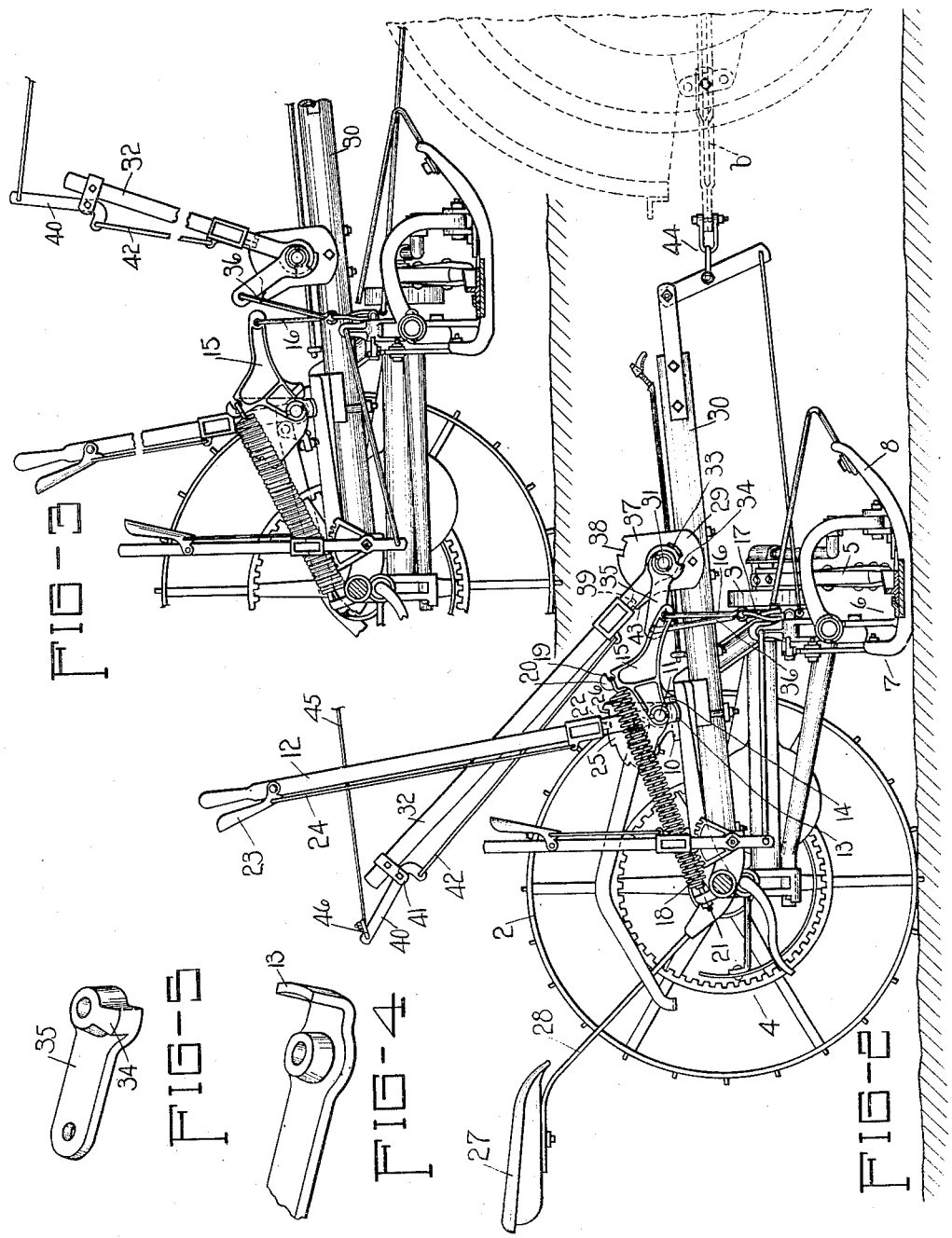

1,822,204

UNITED STATES PATENT OFFICE

WILBUR J. COULTAS, OF MOLINE, ILLINOIS, ASSIGNOR TO DEERE & COMPANY, OF MOLINE, ILLINOIS, A CORPORATION OF ILLINOIS

MOWER

Application filed May 10, 1929. Serial No. 362,025.

This invention relates to mowing machines, and has to do more particularly with the means for raising and lowering the cutter bar out of and into operating position.

In mowing machines, it is the common practice to provide a lifting lever adjacent the operator's seat, this lever being connected to the cutter bar frame for lifting and lowering the same, the cutter bar being raised by rearward movement of the lever, that is, by movement of the lever toward the seat carried by the mower.

When a mowing machine of this type, which may be considered as standard, is attached to a tractor it is impracticable for the operator driving the tractor to move the lifting lever referred to, of the mower, in proper direction to lift the cutter bar since the driver of the tractor is, of necessity, in front of such lifting lever. One of the main objects of my invention is to provide simple and efficient means which can be readily applied to a mowing machine without any alteration in the construction thereof, and by means of which an operator seated in a tractor which draws the mowing machine can readily lift and lower the cutter bar of the mower as desired. Another object is to provide means of the character stated, which, when applied, will occupy but little space and will not in any way interfere with lifting and lowering of the cutter bar, by means of the usual lift lever, by an operator upon the seat of the mower, if necessary or desired. A further object is to provide an additional lift lever for a mowing machine and means for connecting such additional lever to the cutter bar in such manner as to permit of either of the two levers being operated independently of the other lever. A further object is to provide, in conjunction with the two independently operable levers, yielding means tending to lift the cutter bar and effective in the operation of either lever.

Further objects and advantages of my invention will appear from the detailed description.

In the drawings:

Fig. 1 is a plan view of a mowing machine of known construction, indicated as attached to a tractor, illustrating my invention as applied thereto;

Fig. 2 is a section taken substantially on line 2—2 of Fig. 1;

Fig. 3 is a section similar to Fig. 2, partly broken away, showing the cutter bar in raised or lifted position;

Fig. 4 is a perspective detail view of the lower end portion of the lifting lever ordinarily provided on a mower;

Fig. 5 is a perspective detail view of the lifting arm associated with the forward lift lever provided in accordance with my invention.

I have illustrated my invention as applied to a mowing machine of known construction. This machine comprises a frame 1 in which is mounted an axle carrying the ground wheels 2. An eccentric disc 3 is driven in a suitable manner from the axle, as by a gear train 4, and is eccentrically connected to a pitman 5 which serves to drive the cutter bar of the cutter bar structure 6. This structure is carried by a suitable frame 7, at its inner end, comprising a shoe 8. The frame 7 is suitably mounted and braced for supporting the cutting mechanism and for vertical movement toward and away from the ground surface.

A bracket 10 is suitably secured to frame 1 and a stub shaft 11 is mounted in this bracket. A lift lever 12 is loosely pivoted on shaft 11 and projects downwardly a short distance beyond this shaft. At its lower end this lever is provided with a laterally projecting lip 13 disposed in rear of and adjacent an abutment element in the form of a lug 14 on the underface of a lifting arm 15 which is also loosely pivoted upon stub shaft 11, adjacent lever 12. This arm extends forwardly of lever 12 and is connected, at its forward end, by a link 16 depending therefrom to a link 17 suitably secured to frame 7. A lift spring 18 is suitably secured at its forward end, at 19, to the upper end of a finger 20 integral with arm 15 and projecting upwardly therefrom. The rearward end of spring 18 is suitably secured, at 21, to the mower frame. When the cutter bar is in lowered position, spring 18 is under tension, this spring assisting in lifting of the cutter bar. Lift lever 12 is provided with a detent 22 operated by a handle 23 mounted on the lever, and a connecting rod 24. This detent cooperates with a rack 25 carried by bracket 10 for holding the cutter bar in either one of two raised positions, that is, in either a partially raised or lifted position, or a fully lifted position. When the cutter bar is lowered, detent 22 engages into a relatively long notch 26 in rack 25, this notch permitting limited rocking movement of lever 12 on the axis of stub shaft 11 to accommodate desirable vertical movement of the cutter bar in the travel of shoe 8 over the ground surface.

The lift lever 12 is disposed in advance, and at the right hand side, of a seat 27 mounted on a standard 28 suitably secured to the mower frame. To raise the cutter bar structure, detent 22 is disengaged from notch 26 by grasping the upper end of lever 12 and simultaneously swinging the handle 23 toward the lever. This lever 12 is then swung rearwardly so as to bring lip 13 into contact with abutment element 14, after which arm 15 is swung upwardly during continued rearward movement of lever 12 thus lifting the cutter bar to the desired extent. To lower the cutter bar this operation is reversed. It will be noted that, when the cutter bar is in lowered position, arm 15 is free for upward movement about the axis of shaft 11 independently of lever 12. The construction and operation of the mowing machine and the parts thereof above described are well known in the art and need not be further described.

In accordance with my invention, I provide a bracket 29 which is bolted or otherwise suitably secured to tongue 30 of the mower, which projects forwardly from frame 1. A stub shaft 31 is suitably mounted in this bracket and a second lift lever 32 is loosely pivoted on this stub shaft. This lever 32 extends downwardly a short distance beyond the stub shaft and is provided, at its lower end, with an outwardly projecting lip 33. This lip is disposed to contact the forward face of a lug 34 of a lift arm 35 which is also loosely pivoted upon stub shaft 31, adjacent lever 32. This arm is shown more clearly in Figure 5. Arm 35 extends rearwardly from shaft 31 and is connected, at its rearward end, by a depending link 36, to link 17. It will be noted that arm 35, like arm 15, is free to swing upwardly about the axis of shaft 31 independently of its associated lever 32.

The bracket 29 comprises a segment element 37 which is provided, adjacent the front of its upper edge, with a slot 38 for reception of a detent 39 carried by lever 32 and actuated by an angle lever 40, which is pivoted in a clip 41 suitably secured to the upper end of lever 32, and a connecting rod 42. At its upper rear corner, rack element 37 is provided with a stop element 43 disposed for contact by the detent 39 to positively limit rearward movement of lever 32. As will be noted more clearly from Figure 2, when the lever 32 is in its rearward position, lip or element 33 thereof is spaced a short distance in advance of lug 34 of arm 35. It will thus be seen that arm 35, like arm 15, is free for limited oscillatory movement on the axis of stub shaft 31, when the cutter bar is in lowered position, so as to accommodate rise and fall of shoe 8 in its passage over the ground surface.

As will be noted more clearly from Figure 1, lever 32 is disposed inwardly of lever 12, transversely of the mower, a sufficient distance to eliminate possibility of interference between the two levers.

By disposing the two arms 15 and 35 oppositely, the two levers and associated parts may readily be assembled so as to occupy but little space. With the lever 32 in its lowered or inoperative position illustrated in Fig. 2, an operator upon the seat 27 has ample room for operating lever 12 to lift or lower the cutter bar without interfernece by the lever 32. It will thus be seen that the provision of lever 32 and the parts associated therewith in nowise interferes with the lifting and lowering of the cutter bar by an operator upon the seat 27 when necessary or desired. A further advantage of disposing the arms 15 and 35 in the relation illustrated and described is that no change is necessitated in the construction of the mower, the connection to the frame 7 being readily accomplished by the link 36. It will be further noted that the spring 18 is effective to assist in lifting the cutter bar in the operation of either of the lift levers.

I have indicated the mower as attached to a tractor T, having an operator's seat S and a draw bar b, by means of a suitable hitch 44. A pull line 45 is secured, by a double hook 46, to the upper end of angle lever 40. This pull line may be secured at its forward end to a part of the tractor, such as the seat S, in a suitable manner, so as to be readily grasped by an operator upon the seat. With the lever 32 in the position illustrated in Fig. 2, when it is desired to lift the cutter bar the cord 45 is pulled forwardly so as to swing the lever 32 forwardly thus lifting the cutter bar in the manner described.

After the cutter bar has been raised or lifted into the position of Fig. 3, with lever 32 in its most forward position, the pull on line or cord 45 is quickly released so as to cause detent 39 to engage into notch 38, after which contact of this detent with the rearward wall of the notch serves to hold the cutter bar raised. To lower the cutter bar, cord 45 is pulled forwardly sufficiently to withdraw the detent 39 from notch 38 and is kept taut as the lever 32 is permitted to swing rearwardly into the position of Figure 2 thus lowering the cutter bar. When the cutter bar is raised by means of lever 32 and associated parts, arm 15 is swung upwardly independently of lever 12 into the position of Figure 3. During this movement of the arm, spring 18 is effective to assist in lifting of the cutter bar, as previously stated. With both of the levers in cutter bar lowering position, either of the levers can be operated independently of the other lever for lifting or lowering the cutter bar.

My invention is particularly adapted for use with a mowing machine of what may be considered as standard construction to permit of such a machine being attached to a tractor to advantage. In its broader aspects, however, my invention can be applied to advantage to other machines having operating mechanism adapted to be lifted and lowered out of and into operating position.

What I claim is:

1. In combination in a mowing machine comprising a cutter bar, a lifting lever, and operating connections between the lever and the bar, a second lifting lever, and operating connections between the second lever and the bar, each of the operating connections between the respective levers and the bar including parts having limited relative movement in one direction whereby said connections are adapted to permit independent operation of the levers.

2. In combination in a mowing machine comprising a cutter bar, a lifting lever, operating connections between the lever and the bar, and yielding means associated with said connections and tending to lift the bar, a second lifting lever, and operating connections between second lever and the bar, the operating connections between the respective levers and the bar including parts having free relative movement in one direction and limited relative movement in the other direction whereby said connections are adapted to permit independent operation of the levers, said yielding means being effective in the operation of either lever.

3. In combination in a mowing machine comprising a cutter bar, a lifting lever, operating connections between the lever and the bar, a second lifting lever having operating connection to the bar, and yielding means tending to lift the bar and effective in the operation of either lever, said levers being independently operable.

4. In combination in a mowing machine, a cutter bar, a forwardly extending tongue, a lifting lever, a second lifting lever mounted on the tongue forwardly of the first lever, and operating connections between the levers and the bar, said connections including means adapted to permit independent operation of the levers.

5. In combination in a mowing machine, a cutter bar, a lifting lever, operating connections between the lever and the bar comprising a linkage system operable to lift the bar when said lever is moved in bar lifting direction, said linkage system being movable in bar lifting direction independently of the lever when the lever is in bar lowering position, a second lever, and operating connections between the second lever and the bar comprising a linkage system operable to lift the bar when the second lever is moved in bar lifting direction and movable in bar lifting direction independently of said second lever when the second lever is in bar lowering position.

6. In combination in a mowing machine, a cutter bar, a lifting lever, operating connections between the lever and the bar comprising a linkage system operable to lift the bar when said lever is moved in bar lifting direction, said linkage system being movable in bar lifting direction independently of the lever when the lever is in bar lowering position, a second lever, operating connections between the second lever and the bar comprising a linkage system operable to lift the bar when the second lever is moved in bar lifting direction and movable in bar lifting direction independently of said second lever when the second lever is in bar lowering position, and yielding means tending to lift the bar and effective in the operation of either lever.

7. In combination in a mowing machine, a cutter bar, a lifting lever, operating connections between the lever and the bar comprising a linkage system operable to lift the bar when said lever is moved in bar lifting direction, said linkage system being movable in bar lifting direction independently of the lever when the lever is in bar lowering position, a second lever, and operating connections between the second lever and the bar comprising a linkage system operable to lift the bar when the second lever is moved in bar lifting direction and movable in bar lifting direction independently of said second lever when the second lever is in bar lowering position, and yielding means connected to one of the linkage systems and tending to lift the bar.

8. In combination in a mowing machine, a cutter bar, a lifting lever, an arm loosely pivoted adjacent the lever, the lever and the arm having cooperating means for moving the latter upwardly in bar lifting direction when the lever is moved in such direction, a link depending from the arm and connected to the bar for lifting the same, a second lifting lever disposed forwardly of the first lever, a second arm loosely pivoted adjacent the second lever, said second lever and arm having cooperating means for moving the latter upwardly in bar lifting direction when said second lever is moved in such direction, and a link depending from the second arm and connected to the bar for lifting the same, the respective arms having upward movement independently of the associated levers.

9. In combination in a mowing machine, a cutter bar, a lifting lever, an arm loosely pivoted adjacent the lever, the lever and the arm having cooperating means for moving the latter upwardly in bar lifting direction when the lever is moved in such direction, a link depending from the arm and connected to the bar for lifting the same, a second lifting lever disposed forwardly of the first lever, a second arm loosely pivoted adjacent the second lever, said second lever and arm having cooperating means for moving the latter upwardly in bar lifting direction when said second lever is moved in such direction, a link depending from the second arm and connected to the bar for lifting the same, the respective arms having upward movement independently of the associated levers, and a lifting spring connected to one of the arms.

10. In combination in a mowing machine, a cutter bar, a lifting lever, an arm loosely pivoted adjacent the lever and extending forwardly therefrom, the lever and the arm having cooperating means for moving the latter upwardly in bar lifting direction when the lever is moved in such direction, a link depending from the arm and connected to the bar for lifting the same, a lifting spring secured at its rearward end to the frame of the machine and having its forward end connected to the top of the arm, a second lifting lever disposed forwardly of the first lever, a second arm loosely pivoted adjacent the second lever and extending rearwardly therefrom, and a link depending from the second arm and connected to the bar for lifting the same, the second lever and its associated arm having cooperating means for moving the latter in bar raising direction when said second lever is moved in such direction, the respective arms having upward movement independently of the associated levers.

11. In combination in a machine comprising an operating mechanism movable out of and into operating position by lifting and lowering thereof, a lifting lever, operating connections between said mechanism and the lever, a second lifting lever, and operating connections between the second lever and the mechanism, the connections between the respective levers and said mechanism having relatively movable parts collapsible in one direction and provided with means restraining relative movement of said parts in the other direction, whereby either lever may be actuated to move said operating mechanism without effecting any movement of the other lever.

12. In combination in a mowing machine, a cutter bar, a lifting lever operable rearwardly of the mower for lifting the cutter bar, a second lifting lever operable forwardly of the mower for lifting the cutter bar from an operator's position on a tractor in advance of the mower, and operating connections between the levers and the cutter bar, each of said connections including parts yieldable in one direction but capable of transmitting stress in the other, whereby to permit independent operation of the levers.

13. In combination with a mowing machine comprising a cutter bar and a lifting lever operable rearwardly from an operator's station on the machine for lifting the cutter bar, a tractor in advance of and attached to the mowing machine and comprising an operator's station, a second lift lever on the mowing machine and operable forwardly thereof from the operator's station on the tractor for lifting the cutter bar, and operating connections between the levers and the cutter bar, each of said connections including a link connected with the bar and an arm movable relatively to the lever associated therewith in one direction but incapable of moving relatively thereto in the other direction.

14. In combination in a mowing machine, a cutter bar, a lifting lever, a second lifting lever, and separate operating connections between the respective levers and the cutter bar adapted to permit independent operation of the levers, said separate connections including parts capable of transmitting stress in one direction only.

15. In combination in a mowing machine, a cutter bar, a lifting lever, an arm loosely pivoted adjacent the lever, the lever and the arm having cooperating lugs for moving the latter upwardly in bar lifting direction when the lever is moved in such direction, the arm having upward movement independently of the lever, a second lifting lever, a second arm loosely pivoted adjacent the second lever, said second lever and arm having cooperating lugs for moving the latter upwardly in bar lifting direction when the second lever is moved in such direction, said second arm having upward movement independently of the second lever, and link connections between the respective arms and the cutter bar.

16. In combination in a mowing machine, a cutter bar, a lifting lever, a second lifting lever, separate connections between the levers and the cutter bar whereby either of the levers can be actuated to lift the cutter bar, each of said separate connections being yieldable in one direction whereby when one lever is actuated to raise the cutter bar the other lever remains in its initial position, and a spring connected with the frame and the cutter bar and operable to aid either lever in raising the cutter bar.

17. In combination in a mowing machine, a cutter bar, a lifting lever, a second lifting lever, operating connections including relatively movable parts between the respective levers and the cutter bar adapted to permit independent operation of the levers, latches on each of said levers, and sector means associated with each of said levers and cooperating with said latches to hold either of the levers in different positions.

18. In combination with a mowing machine comprising a cutter bar and a lifting lever operable rearwardly from an operator's station on the machine for lifting the cutter bar, a tractor in advance of and attached to the mowing machine and comprising an operator's station, a second lift lever on the mowing machine and operable forwardly thereof from the operator's station on the tractor for lifting the cutter bar, operating connections including relatively movable parts between the respective levers and the cutter bar adapted to permit independent operation of the levers, latches on each of the levers, sector means associated with each of the levers and cooperating with said latches to hold the levers in adjusted position, and means for operating the second lift lever, said means also operating the latch means for that lever.

19. In combination with a mowing machine including a cutter bar, a tractor in advance of and attached to the mowing machine and comprising an operator's station, a lift lever on the mowing machine and operable forwardly, means for operating said lift lever from the operator's station on the tractor for lifting the cutter bar, latch means on the lever and associated sector means for holding the lift lever in elevated cutter bar position, and means for operating said latch means from said lever operating means whereby the latter can be actuated to engage or release the latch means.

In witness whereof, I hereunto subscribe my name this 3rd day of May, 1929.

WILBUR J. COULTAS.